United States Patent [19]

Schmidt

[11] Patent Number: 4,640,365

[45] Date of Patent: Feb. 3, 1987

[54] ROW FOLLOWING GUIDANCE DEVICE FOR A TRACTOR-DRAWN ROW CROP IMPLEMENT

[76] Inventor: Eugene H. Schmidt, P.O. Box 821, Lexington, Nebr. 68850

[21] Appl. No.: 726,802

[22] Filed: Apr. 24, 1985

[51] Int. Cl.$^4$ ............................................. A01B 69/06
[52] U.S. Cl. ................................. 172/26; 104/244.1; 180/131
[58] Field of Search .................. 172/5, 6, 23, 26, 233, 172/234, 235, 272; 180/79, 131; 104/244.1; 56/10.2, DIG. 15

[56] References Cited

U.S. PATENT DOCUMENTS

| | | | |
|---|---|---|---|
| 1,111,243 | 9/1914 | Whitworth | 172/26 |
| 3,537,531 | 11/1970 | Fischer et al. | 172/26 |
| 3,797,602 | 3/1974 | Sumida | 180/131 |
| 3,998,275 | 12/1976 | Eisenhardt | 172/26 |
| 4,180,133 | 12/1979 | Collogan et al. | 172/26 |
| 4,184,551 | 1/1980 | Orthman | 172/26 |
| 4,228,860 | 10/1980 | Orthman | 172/26 |
| 4,463,811 | 8/1984 | Winter | 172/26 |

*Primary Examiner*—Richard T. Stouffer
*Attorney, Agent, or Firm*—E. Robert Newman

[57] ABSTRACT

A row following guidance device connecting the right and left ends of the forward portion of a row crop implement to a tractor will adjust the length of each left and right connection as the tractor deviates laterally from alignment with the crop rows to correctively guide the implement in alignment with the crop rows. A row following wheel signals a steering valve upon any lateral deviation of the implement from crop row alignment, the steering valve correcting the deviation by lengthening one connection between the tractor and the implement and shortening the other. The row following wheel is mounted for movement independent of the implement so that the implement may be raised or lowered without affecting the operation of the wheel.

19 Claims, 8 Drawing Figures

ROW FOLLOWING GUIDANCE DEVICE FOR A TRACTOR-DRAWN ROW CROP IMPLEMENT

TECHNICAL FIELD

The present invention relates generally to row following devices attached to tractor-drawn implements and more specifically to row following devices which are sensitive to lateral movement of the implement along a crop row and which realign the implement to follow the row independently of the lateral position of the tractor.

BACKGROUND ART

It has long been a problem in the operation of farm equipment to guide various implements through a crop field, without accidentally deviating from the crop row and destroying planted crops. Various tractor-drawn implements may carry ground working tools spaced as close as 4" apart. The tractor operator is generally situated in a cab located several feet above and forward of the implement, so that it is difficult to view the actual engagement of the tools with the ground. All the operator can do is attempt to keep the tractor centered relative to the rows.

The problem of maintaining the ground working tools between the rows becomes critical in an operation such as cultivating where only a slight lateral misalignment of the tractor with the rows will cause the implement to uproot several rows of crops. This problem is enhanced as the operator speeds many hours in the field following long rows of crops. In the small amount of time it takes to turn from observing the implement to look forward to align the tractor in the rows, a few feet of crops can be uprooted due to a slight misalignment of the implement with the crop row.

DISCLOSURE OF THE INVENTION

It is therefore an object of the present invention to provide an improved row following device for guiding a tractor drawn row crop implement.

Another object of the invention is to provide a row following guidance device which will adjust the path of a tractor-drawn implement so that it will follow a crop row independently of the tractor's lateral position in relation to the crop rows.

A further object is to provide a row following guidance device which is automatically responsive to lateral movement of the implement, to correctly steer the implement back to a row following position centered within the crop rows.

Yet another object of the invention is to provide a row following guidance device which may be easily and removably attached to various implements.

Still a further object is to provide a row following guidance device which is vertically adjustable independent of the implement so that the implement may be maintained at any uniform depth in the ground without affecting the operation of the row following device.

Yet a further object is to provide a row following guidance device which may be attached to a vehicle with different types of hitches.

More generally, it is an object of the present invention to provide a row following guidance device which will connect the left and right sides of the forward end of an implement to a tractor and which will adjust the length of each left and right connection such that the implement will follow a crop row independently of lateral deviations of the tractor from the crop row. The device is mounted within a conventional quick-hitch so that it may be used upon a variety of different implements. A row following wheel signals a steering valve upon any deviation from the alignment of the implement with the crop row, and the steering valve corrects the deviation by lengthening one connection between the tractor and the implement and shortening the other connection. The row following wheel is mounted for movement independent of the implement so that the implement may be raised or lowered without affecting the operation of the wheel.

These and other objects, advantages, and novel features of the present invention will become apparent from the following detailed description of the invention when considered in conjunction with the accompanying drawings.

BEST MODE FOR CARRYING OUT THE INVENTION

Figure 1:
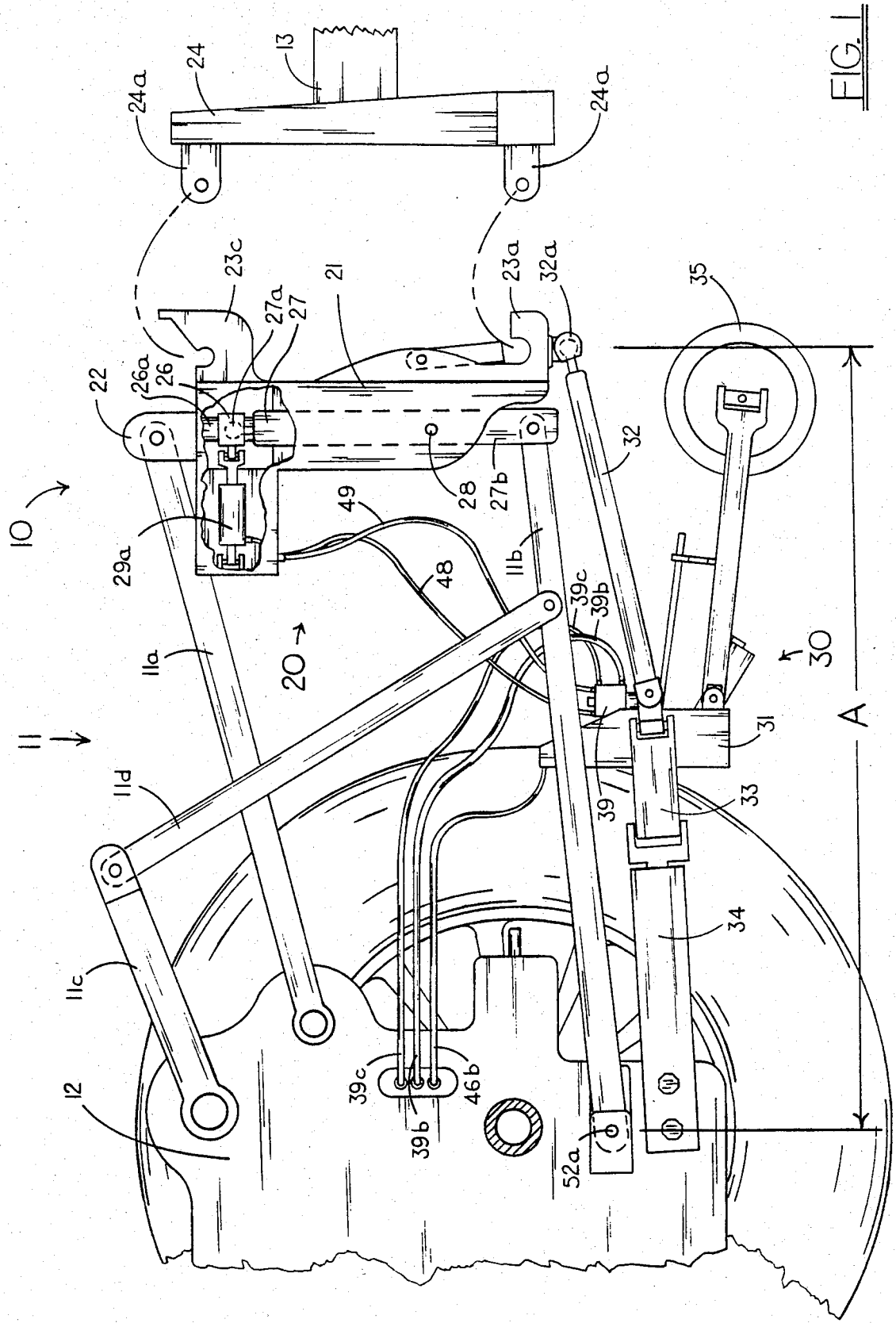
FIG. 1 is a side elevational view of the invention installed on a tractor, the near wheel on the tractor removed.

Referring now to the drawings, in which identical or corresponding parts are indicated by the same reference character throughout the several views, and more particularly to FIG. 1, the row following guidance device is designated generally at 10 and is attached to a conventional three-point hitch, designated generally at 11, on a tractor 12.

The guidance device 10 includes an implement correction assembly, designated generally at 20, which operates to guide an implement 13 along a crop row independently of minor lateral deviations from that path by tractor 12, and a lateral movement detection assembly, designated generally at 30, which responds to lateral deviations from the crop row by implement 13 and transmits signals to implement correction assembly 20 to correct the path of implement 13.

Figure 2:
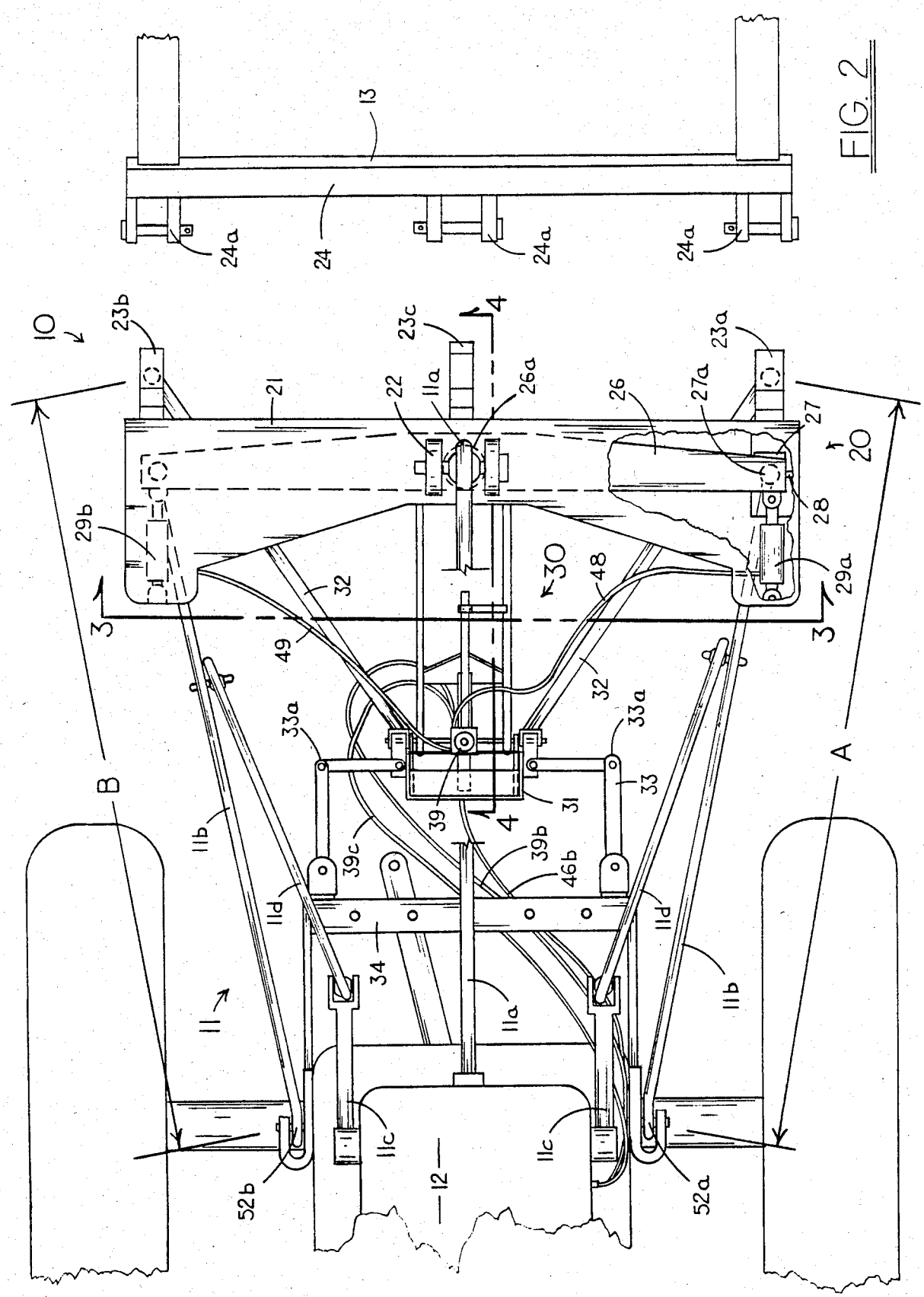
FIG. 2 is a top view of the invention as shown in FIG. 1.

Referring now to FIGS. 1 and 2, implement correction assembly 20 is installed within the housing of a conventional quick-hitch 21. Quick-hitch 21 has a pin-and-clevis mount 22 centered on its upper surface, for attachment to the ball on the free end of lift arm 11a of three-point hitch 11. A left 23a, right 23b, and center 23c, rearwardly projecting hook are conventional on quick-hitch 21, and are used for attachment to the corresponding pin-and-clevis mounts 24a on tool bar 24 of implement 13.

Figure 3:
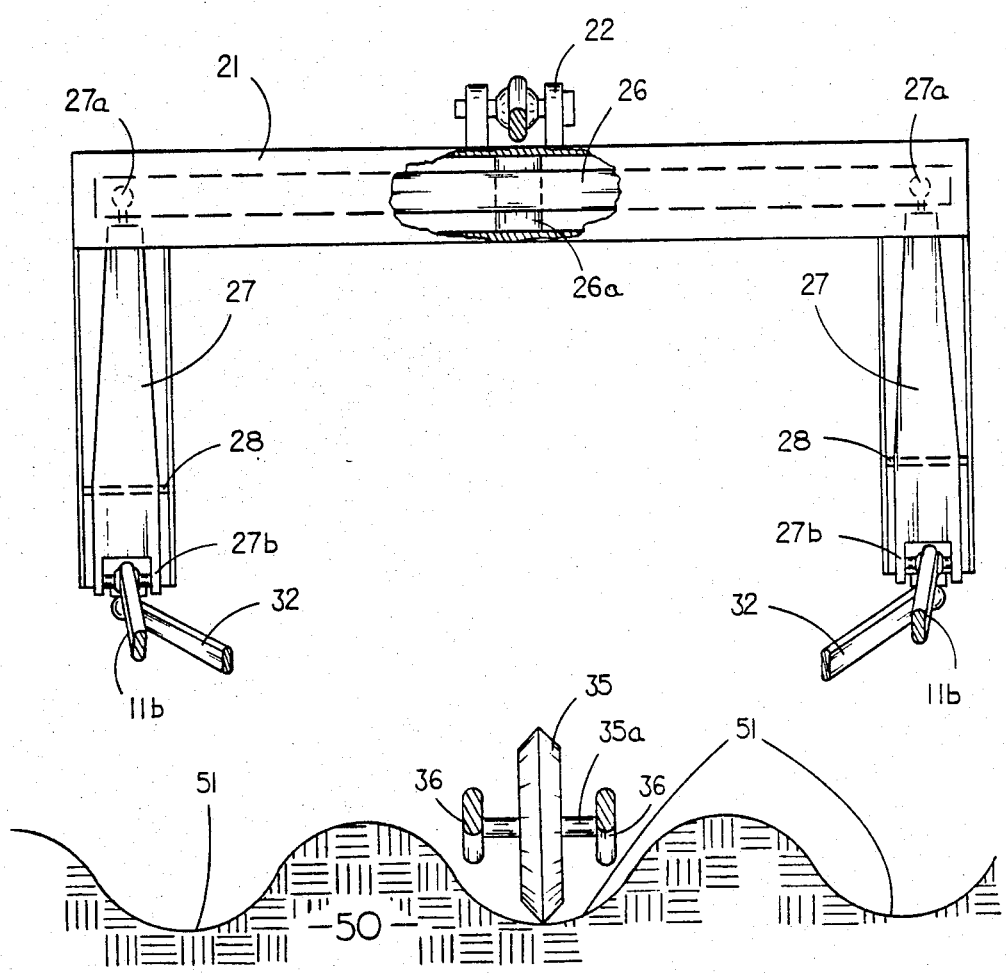
FIG. 3 is a front elevational view of the device taken from lines 3—3 in FIG. 2.

Referring now to FIGS. 1, 2 and 3, quick-hitch housing 21 is generally in the shape of an inverted "U", the base portion of the "U" being fitted with a horizontal tie rod 26 which is attached for pivotal movement about a vertical pin 26a passing through the center of tie rod 26. Thus, as tie rod 26 pivots, each end thereof will travel an equal distance in opposite directions within a generally horizontal plane.

The upper end of a vertical lever 27 is attached via a conventional ball joint 27a to each free end of tie rod 26. Each lever 27 is pivotally attached on a pin 28 journaled through the vertical sides of the legs of quick-hitch housing 21, and have axial pivotal axes located approximately two-thirds of the distance down from upper ball joint 27a. Thus, the upper end of lever 27 will move a distance approximately twice that of the lower end, and in the opposite direction. The lower end of each vertical lever 27 is affixed with a pin-and-clevis mount 27b to the ball of the free end of each lower arm 11b of three-point hitch 11. Lower arms 11b of three-point hitch 11 are attached to upper lift arms 11c via intermediate members 11d in a conventional manner. The combination of each lower arm 11b of three-point hitch 11 with the corresponding lever 27 attached thereto, forms articulated members which will act to increase or decrease the distance between tractor 12 and the pivotal connection at pin 28 at which each lever 27 is mounted.

It should be noted at this point that horizontal tie rod 26 will bend slightly, and the connections at pins 28 and at pin-and-clevis mounts 27b are slightly loose in order to allow for the various pivoting movements to occur.

Referring again to FIGS. 1 and 2, a hydraulic cylinder 29a has pivotal mounts at each end for attachment between one free end of tie rod 26 and the free end of a support extension of quick-hitch housing 21. When activated, cylinder 29a will push or pull the end of tie rod 26 about vertical pin 26a. A second hydraulic cylinder 29b is attached to the opposing free end of tie rod 26 and acts in a similar fashion. Each hydraulic cylinder 29a and 29b is signaled by lateral movement detector assembly 30 in a manner to be described below.

Lateral movement detection assembly 30 is mounted between tractor 12 and quick-hitch 21. A base frame 31 for the assembly 30 components is held generally centered in front of quick-hitch 21 by elongated carrier arms 32. One carrier arm 32 is mounted on one end to the lower surface of left hook 23a and a second carrier arm 32 is mounted on one end to the lower surface of right hook 23b via ball joints 32a. The other end of each carrier arm 32 is pivotally connected to each side of base frame 31 and have pivotal axes which are horizontal and axial, thus, base frame 31 may only pivot in a vertical plane.

Base frame 31 is held at a constant height above the ground by a pair of jointed arms 33 attached between tractor draw bar 34 and each side of base frame 31. Each jointed arm 33 has two approximately equal portions connected at an elbow joint 33a, having a vertical pivotal axis, and is pivotally connected at each end about vertical axes. Thus, jointed arms 33 will only allow base 31 to move in a horizontal plane.

Lateral movement of tractor 12 is allowed by jointed arms 33, and vertical movement of quick-hitch 21 is allowed by carrier arms 32, neither movement affecting the position of base 31 centered in front of quick-hitch 21.

Figure 4:
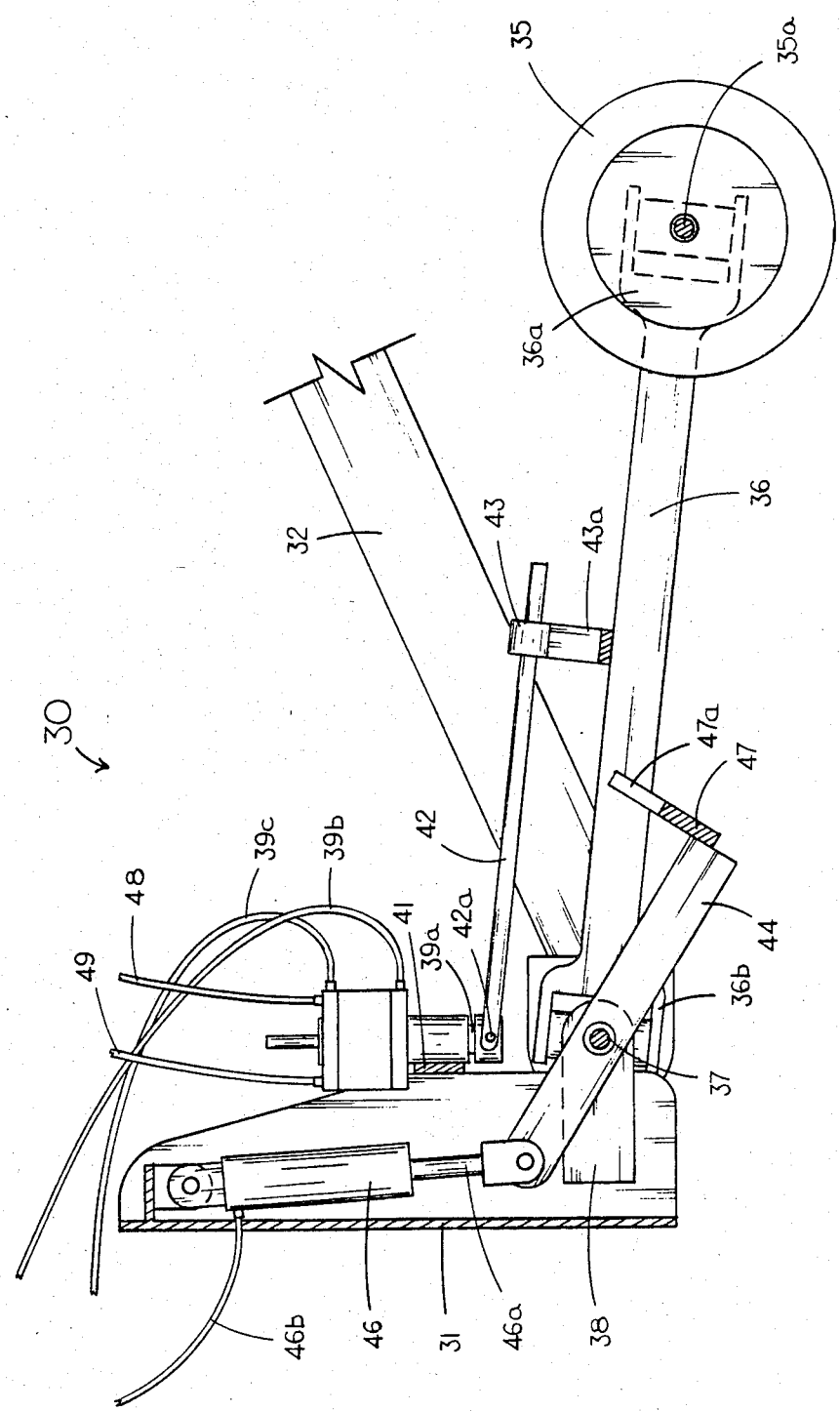
FIG. 4 is an enlarged sectional view of a portion of the device taken at lines 4—4 in FIG. 2.
Figure 5:
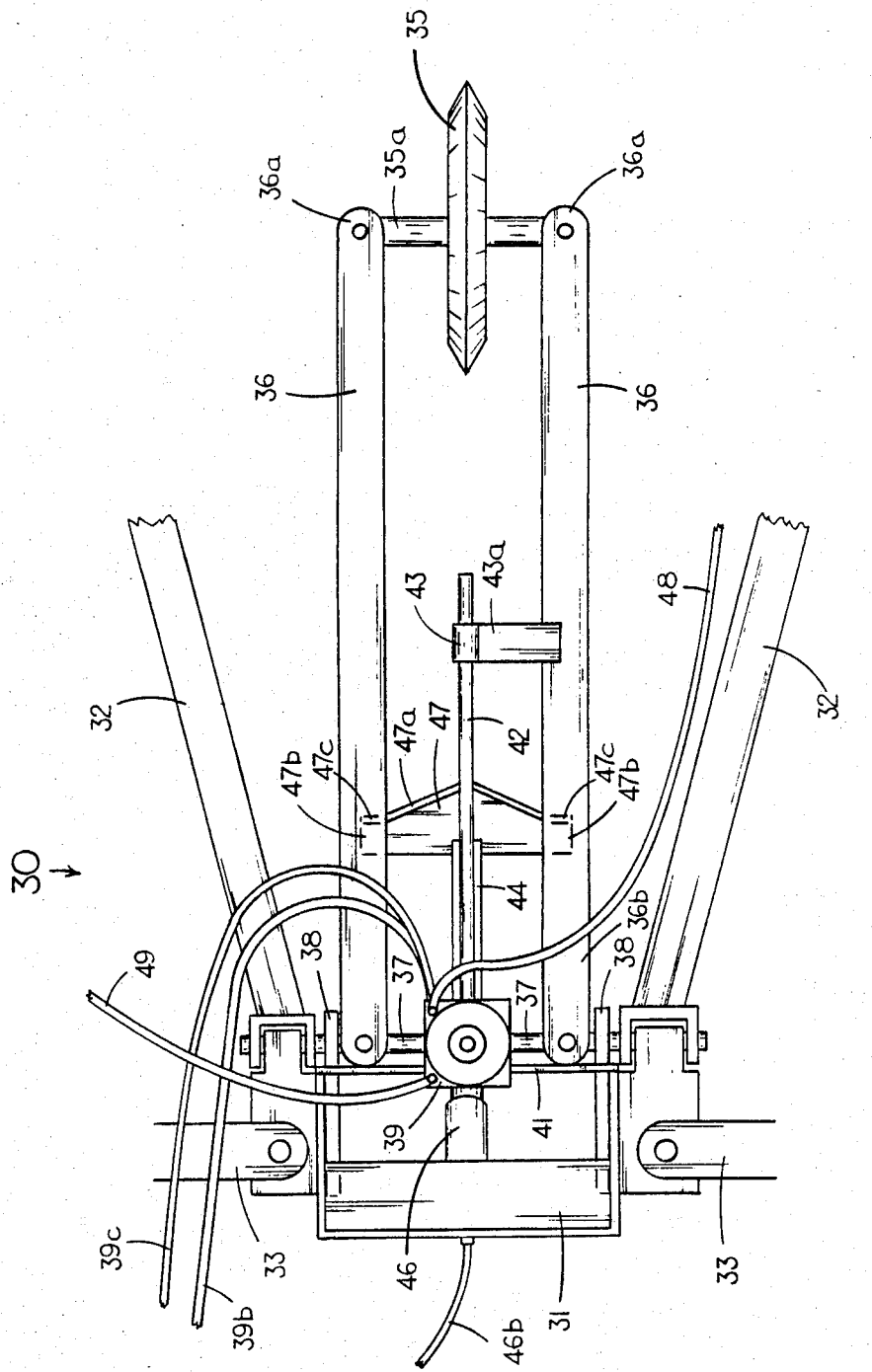
FIG. 5 is an enlarged top view of the device shown in FIG. 4.

Referring now to FIGS. 4 and 5, lateral movement detection assembly 30 includes a rotatable wheel 35 mounted on an axle 35a between the ends 36a of two parallel arms 36. The other end 36b of each parallel arm 36 is pivotally connected to a pin 37 which is parallel to axle 35a, and is mounted to base frame 31. Axle 35a is mounted transverse to the crop rows so that wheel 35 will remain aligned with the rows. Each end 36a and 36b of parallel arms 36 have parallel axes. In order to save on materials, pin 37 also serves as the pivotal axis for carrier arms 32. A bracket 38 affixed to each side of base 31 supports pin 37.

Each end 36b of arm 36 is also adapted for pivotal movement in both vertical directions in order to allow wheel 35 to rise or fall over bumps. Thus, while base 31 may move laterally or vertically in relation to wheel 35, axle 35a of wheel 35 will remain parallel to pin 37. This parallelogram arrangement aids wheel 35 in remaining in the crop row as base 31 moves laterally in relation to the crop rows.

A hydraulic steering valve 39 is mounted to base 31 with a rigid strap 41 which extends between the sides of base 31, and communicates with tractor 12 via hydraulic supply line 39b and return line 39c. An actuator rod 39a extends vertically through steering valve 39 and projects out the bottom thereof. An elongated arm 42 has a pin-and-clevis mount 42a which is attached to the lower projecting end of actuator rod 39a, with the pin perpendicular to the longitudinal axis of actuator rod 39a. Thus, arm 42 will rotate actuator rod 39a when base 31 moves laterally in relation to the crop rows. The clevis end 42a of arm 42 will allow arm 42 to pivot within a vertical plane without affecting the operation of actuator rod 39a.

The free end of arm 42 has a collar 43 slidably mounted thereon. An extension strap 43a from collar 43 is affixed to one of parallel arms 36. In FIGS. 4 and 5 arm 42 and actuator rod 39a are shown in a neutral position, with arm 42 in a vertical plane parallel to the crop row. As parallel arms 36 move through various angles caused by the horizontal lateral movement of base 31 (as it follows tractor 12), arms 42 will be held parallel to parallel arms 36 by collar 43, thereby rotating actuator rod 39a and activating steering valve 39. As actuator rod 39a is rotated out of its neutral position, steering valve 39 will cause hydraulic pressure to be communicated to one of cylinders 29a or 29b (see FIGS. 1 & 2) via hydraulic line 48 or 49, respectively. This hdraulic pressure will cause cylinder 29a or 29b to extend, pivoting tie rod 26 and causing the opposing cylinder 29b or 29a to retract. If arm 42 is rotated in the opposite direction, the retracted cylinder 29b or 29a will extend, causing the extended cylinder 29a or 29b to retract. As long as steering valve actuator 39a remains out of the neutral position, a cylinder 29a or 29b will be activated.

A lever 44 is mounted for pivotal movement upon pin 37 and in a plane perpendicular to pin 37, and is centered between parallel arms 36, (when they are in a neutral position). A hydraulic cylinder 46, pivotally mounted within base frame 31, has its extendable rod portion 46a pivotally connected to one end of lever 44 and lies in the pivotal plane of lever 44. Hydraulic power for cylinder 46 is supplied from tractor 12 by hydraulic line 46b, causing cylinder 46 to pivot lever 44 about pin 37.

A centering plate 47 is affixed perpendicularly to the free end of lever 44, and is generally rectangular in shape with a projecting triangular portion 47a along its top edge. The length of plate 47 is slightly greater than the distance between parallel arms 36, so that plate 47 will lift parallel arms 36 when cylinder 46 is activated. Triangular portion 47a has a base with a length equal to the distance between parallel arms 36 and is slightly less than the length of rectangular portion 47b, so that shoulders 47c are formed on rectangular portion 47b upon which parallel arms 36 will rest when in a centered position. The apex of triangular portion 47a is centered between parallel arms 36 when they are in the neutral position. It can thus be seen that when it is desired to lift wheel 35 from the ground (such as to turn a corner) cylinder 46 is activated so as to pivot lever 44 and raise centering plate 47 upwards against parallel arms 36. If parallel arms 36 are not properly centered, the slope of the sides of triangular portion 47a will cause one or the other arm 36 to slide downward and laterally to shoulder 47c, thereby centering follower wheel 35. Then, when the operator is ready to proceed again, lever 44 will lower wheel 35 to the ground in an already centered condition, ready for operation.

Figure 6:
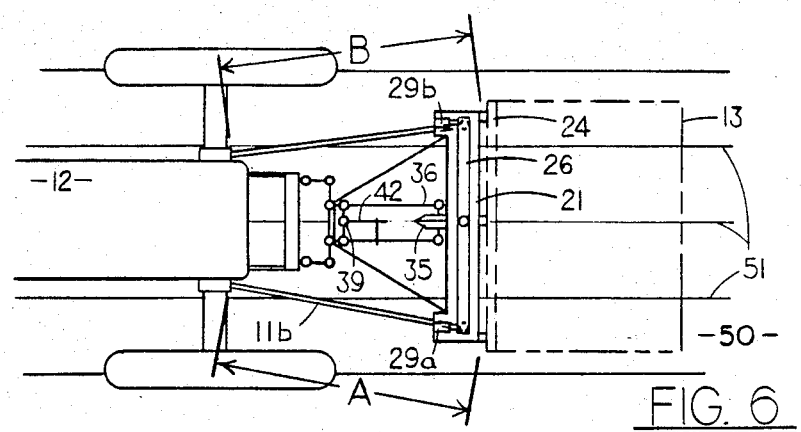
FIG. 6 is a top view of the device installed on a tractor as it is drawn through a field.
Figure 7:
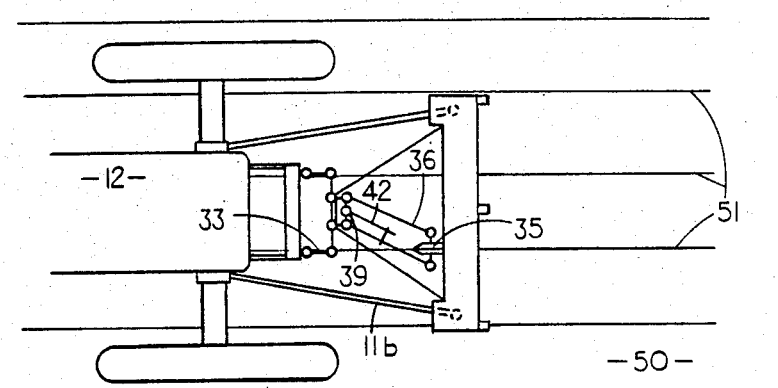
FIG. 7 is a top view of the device installed on a tractor as it is drawn through a field, and additionally showing the tractor and implement shifted laterally from the crop rows.
Figure 8:
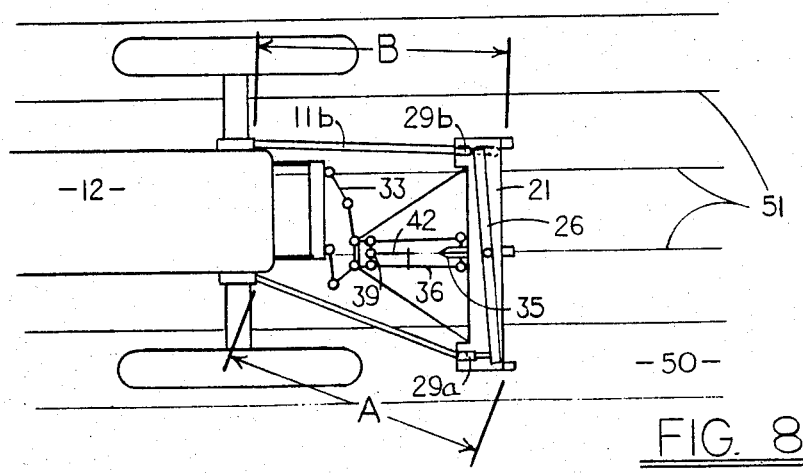
FIG. 8 is a top view of the device installed on a tractor as it is drawn through a field showing the tractor shifted laterally and the implement corrected to alignment with the crop rows.

Referring now to FIGS. 6, 7 and 8, the guidance device 10 will operate in the manner described below to correct lateral deviation of implement 13 from the crop row.

FIG. 6 shows tractor 12 and implement 13 aligned in a field 50 with valleys of crop rows are generally indicated by lines 51. Thus, follower wheel 35 will follow each crop row within a valley 51, (see also, FIG. 3). Since wheel 35 is mounted on an axle 35a which is always kept perpendicular to the crop rows by virtue of the parallelogram arrangement of parallel arms 36 with axle 35a, wheel 35 is less likely to "climb" the crop row, and will more easily follow valley 51.

In order to more easily see the sequence of steps which occur in the operation of the invention 10, the movement of all parts will be greatly exaggerated in FIGS. 7 and 8. Thus, FIG. 7 shows tractor 12 and quick-hitch 21 shifted laterally to an exagerated degree while follower wheel 35 remains within valley 51 following the crop row. It should be noted that FIG. 7 shows the misalignment of implement 13 before corrections are made by row following device 10, and in actual operation such a misalignement would not occur since the device is making incremental corrections immediately upon misalignement.

As implement 13 begins to shift laterally in relation to the crop rows 51, base 31 will also shift laterally, causing arm 42 to activate steering valve 39 as arm 42 is pulled by parallel arms 36 out of its neutral position. Activation of steering valve 39 will cause one of cylinders 29a or 29b to extend, causing the other cylinder 29b or 29a to retract, corresponding to the direction in which actuator 39a is rotated. In the situation shown in FIGS. 6, 7 and 8, cylinder 29a (see also FIG. 1) will be caused to be extended, pivoting the corresponding lever 27 about pin 28 such that quick-hitch housing 21 will be forced rearwardly on that end. It can therefore be seen that the effective length, designated as A, between right implement hook 23a and the point 52a at which that side of housing 21 is connected to tractor 12 has been increased. At the same time the effective length "B" between the left implement hook 23b and the corresponding point 52b on tractor 12, will be decreased in a directly proportional amount. Effective lengths "A" and "B" are caused to increase of decrease by the actions of each articulated member comprised of lever 27 connected to lower arm 11b of three-point hitch 11. Tie rod 26, attached between the tops of levers 27 serves to translate this movement in a directly proportional amount in the opposite direction to the opposing cylinder 29b.

Obviously, two-way cylinders could be installed to replace the one-way cylinders 29a and 29b described herein. In such a case tie rod 26 would not be necessary except to stabilize the actions of each cylinder. As cylinders 29a and 29b are activated, and effective length "A" increases and effective length "B" decreases, quick-hitch 21 (along with implement 13 attached thereto) will realign itself along the crop row, as shown in FIG. 8. Once implement 13 is realigned, arm 42 will once again be in its neutral position with respect to base 31, and cylinders 29a and 29b will maintain their respective positions.

It should be noted at this point that the pivotal connection of lower arms 11b of three-point hitch 11 to tractor 12 loose enough to allow the horizontal pivotal movement of these arms 11b as implement 13 is corrected to its row following position. The amount of lateral shifting shown in the drawings is greatly exagerrated, and the actual horizontal pivotal movement necessary to accomplish the lateral corrections is minimal.

It should also be noted that guidance device 10 could be mounted directly upon implement 13, rather than within quick-hitch housing 21. However, mounting the device 10 on a hitch allows use of one device 10 with many different implements 13. Similarly, the invention 10 may be mounted on other types of hitches than the quick-hitch 21 or three-point hitch 11 described herein. Thus, the consumer need not purchase new equipment to which the invention 10 would be mounted.

It will be readily understood that the particular disposition or arrangement or nature of the elements of the invention are not of the essence of the invention, and that many variations, substitutions, and modifications may be made, in departure from the particular construction and characterization in the drawings and foregoing descriptions, without departing from the true spirit of the invention. It is therefore to be understood that the invention should be limited only by the breadth and scope of the appended claims.

What is claimed is:

1. A row following guidance device for a tractor-drawn row crop implement, comprising:
an inverted "U"-shaped mounting bar having means for attachment to the forward end of the implement, which attachment means are adapted to be arranged transversely of the crop rows;
means for controllably increasing the distance between one end of said mounting bar and the tractor, and decreasing the distance between the other end of said mounting bar and the tractor, including:
a first articulated member including an elongated arm and a lever, the elongated arm of said first articulated member having means for pivotally connecting it to one end to the tractor about an axis parallel to the axis of articulation of said first articulated member and adapted for horizontal pivotal movement, the lever of said first articulated member being pivotally connected at a point on the lever about an axis parallel to said axis of articulation to an end of said mounting bar;
a second articulated member including an elongated arm and a lever, the elongated arm of said second articulated member having means for pivotally connecting it at one end to the tractor about an axis parallel to the axis of articulation of said second articulated member and adapted for horizontal pivotal movement, the lever of said second articulated member being pivotally connected at a point on the second member lever about an axis parallel to said second member axis of articulation to the other end of said mounting bar, and wherein said first and second axes of articulation of said first and second articulated members, respectively, are parallel;

a horizontal arm pivotally connected at each end to a point on each of the levers of said first and second articulated members, each said point being spaced away from the pivotal conenction of each said lever to said mounting bar, said horizontal arm adapted for transmitting pivotal movement of one of said levers to the other of said levers; whereby the increase in distance between the tractor and the pivotal connection of said one lever to said mounting bar is proportionately decreased between the tractor and the pivotal connection of said other lever to said mounting bar;

means connected to said mounting bar adapted to be responsive to lateral movements of said mounting bar in relation to the crop rows for transmitting signals to said means controllably increasing and decreasing distance, whereby said implement is guidable along a crop row independently of lateral movement of the tractor; and means activated by said signal transmitting means for pivoting said levers about their pivotal connections to said mounting bar, further including:

a first hydraulic cylinder pivotally connected at one end to said mounting bar and pivotally connected at the other end to the lever of said first articulated member at a point spaced away from the pivotal connection of said first member lever to said mounting bar, and a second hydraulic cylinder pivotally connected at one end to said mounting bar and pivotally connected at the other end to the lever of said second articulated member at a point spaced away from the pivotal connection of said lever to said mounting bar.

2. The guidance device of claim 1, wherein said signal transmitting means includes:

a hydraulic steering valve having a means for attachment to the tractor and a rotatable actuator rod which projects from the bottom of said valve;

an arm pivotally connected at one end for vertical pivotal movement, to the projecting end of said actuator rod, for activating said steering valve by rotating said actuator rod; and row following means pivotally connected to said mounting bar and adapted to move said activating arm so as to rotate the actuator rod when said mounting bar moves laterally in relation to said crop rows.

3. The guidance device of claim 2, wherein said row following means includes:

a rotatable wheel on an axle, said axle pivotally mounted to a pair of parallel arms so as to be adapted to be arranged transversely of said crop rows, said axle being mounted between the ends of said pair of parallel arms, for pivotal movement in the same plane as said arms, said parallel arms being universally connected at their other ends to a pin equal in length to said axle, whereby said axle will remain parallel to said pin and will form a parallelogram with respect to said parallel arms and said pin; and a collar slidably inserted upon said steering valve activating arm and extending to one of said parallel arms where it is affixed, said collar holding the activating arm parallel to said parallel arms during pivotal movement of said parallel arms.

4. The guidance device of claim 3 further comprising means for selectively one of raising and lowering said wheel from the ground.

5. The guidance device of claim 4, wherein said selectively raising and lowering means includes a lever pivotally attached near its center to said mounting bar, and a hydraulic cylinder pivotally attached at one end to a free end of said lever and pivotally attached at the other end to said tool bar such that activation of said cylinder will pivot said lever; and wherein the free end of said lever has a plate mounted thereon which projects so as to contact the underside of one of said parallel arms, whereby said parallel arms may be lifted by activation of said cylinder.

6. The guidance device of claim 5, further comprising means for centering said wheel when raised from the ground, to a position such that the steering valve activating arm is parallel to said crop rows.

7. The guidance device of claim 6, wherein said wheel centering means includes a triangular shaped plate affixed edge to edge and co-planer with said plate mounted on said lever of said raising and lowering means and having its apex centered between said parallel arms when said parallel arms are in a neutral position; said triangular plate having a base of a length equal to the distance between said parallel arms; and wherein said lever plate has a length slightly greater than the length of the base of said triangular plate, such that a shoulder is formed at each end of the edge of said lever plate which extends beyond the base of said triangular plate; and wherein said triangular plate is raised by activating said lever of said raising and lowering means, said lever plate contacting the underside of said parallel arms along a sloping edge of said triangular plate, said arms sliding into a centered position upon the shoulders of said lever plate.

8. The guidance device of claim 7, wherein said mounting bar includes a conventional quick-hitch housing and an implement tool bar; whereby the guidance device may be hitched on the tool bar of various implements.

9. The guidance device of claim 8, wherein the elongated arms of said first and second articulated members are the lower two arms of a conventional three-points tractor hitch.

10. A row following guidance device for a tractor-drawn row crop implement, comprising:

an inverted "U"-shaped mounting bar having means for attachment to the forward end of the implement, which attachment means are adapted to be arranged transversely of the crop rows;

means for controllably increasing the distance between one end of said mounting bar and the tractor, and decreasing the distance between the other end of said mounting bar and the tractor; and means connected to said mounting bar adapted to be responsive to lateral movements of said mounting bar in relation to the crop rows, for transmitting signals to said distance-increasing-and-decreasing means; whereby said implement is gridable along a crop row independently of lateral movement of the tractor, including:
- a hydraulic steering valve having means for attachment to the tractor and a rotatable actuator rod which projects from the bottom of said valve;
- an arm pivotally connected at one end for vertical pivotal movement, to the projecting end of said actuator rod, for activating said steering valve by rotating said actuator rod; and
- row following means pivotally connected to said mounting bar and adapted to move said activator arm so as to rotate the actuator rod when said mounting bar moves laterally in relation to said crop rows.

11. The guidance device of claim 10, wherein said row following means includes:
- a rotatable wheel on an axle, said axle pivotally mounted to a pair of parallel arms, so as to be adapted to be arranged transversely of said crop rows, said axle being mounted between the ends of said pair of parallel arms for pivotal movement in the same plane as said parallel arms, said parallel arms being universally connected at their other ends to a pin equal in length to said axle, whereby said axle will remain parallel to said pin and will form a parallelogram with respect to said parallel arms and said pin; and
- a collar slidably inserted upon said steering valve activating arm and extending to one of said parallel arms where it is affixed, said collar holding the activating arm parallel to said parallel arms during pivotal movement of said parallel arms.

12. The guidance device of claim 11 further comprising means for selectively one of raising and lowering said wheel from the ground.

13. The guidance device of claim 12, wherein the means for attachment of said steering valve to the tractor includes a base frame pivotally supported for movement in a single plane and having means for pivotal attachment to said pin and wherein said selectively raising and lowering means includes a lever pivotally attached near its center to said base frame, and a hydraulic cylinder pivotally attached at one end to a free end of said lever and pivotally attached at the other end to said base frame such that activation of said cylinder will pivot said lever, and wherein the free end of said lever has a plate mounted thereon which projects so as to contact the underside of one of said parallel arms, whereby said parallel arms may be lifted by activation of said cylinder.

14. The guidance device of claim 13, further comprising means for centering said wheel when raised from the ground, to a position such that the steering valve activator arm is adapted to be parallel to said crop rows.

15. The guidance device of claim 14, wherein said wheel centering means includes a triangular shaped plate affixed edge to edge and co-planer with said triangular plate mounted on said lever and having its apex centered between said parallel arms when said parallel arms are in a neutral position; said triangular plate having a base of a length equal to the distance between said parallel arms; and wherein said lever plate has a length slightly greater than the length of the base of said triangular plate, such that a shoulder is formed at each end of the edge of said lever plate which extends beyond the base of said triangular plate; and wherein said triangular plate is raised by activating said lever, said plate contacting the underside of said parallel arms along a sloping edge of said triangular plate, said arms sliding into a centered position upon the shoulders of said lever plate.

16. The guidance device of claim 13, wherein the pivotal connection of said row following means includes carrier members universally connected at each end of said mounting bar and pivotally connected about a horizontal axis at their other ends to said base frame, whereby said base frame is held within a vertical plane in front of said mounting bar and wherein a pair of articulated arms having vertical axes of articulation have means for pivotal connection at one end to said tractor and are pivotally connected at the other end to said base frame, each end of said connection means having a pivotal axis parallel to said axes of articulation, whereby said articulated arms will hold said base frame within a single plane.

17. A row following guidance device for a row crop implement drawn by a tractor with a hitch, comprising:
- an "L"-shaped portion of an inverted "U"-shaped support means, having means for rigid attachment to the crop implement at one end of one leg of which "L"-shaped portion which leg extends horizontally at a right angle to the direction of travel, said "L"-shaped portion further having a leg depending from said one leg;
- an extending support means aligned with the direction of travel and rigidly attached to said "L"-shaped portion at the juncture of its two legs, said support means extending outwardly from said "L"-shaped portion to a free end thereof;
- a lever connected intermediate its ends, for pivotal rotation about a horizontal axis oriented transverse to the direction of travel, to a point on the depending leg of said "L"-shaped portion near the lower end thereof, said lever having means for pivotal connection at its lower end to the trailing end of an arm of the tractor hitch and being pivotally connected at its upper end to the end of a horizontal tie rod which rotates about a vertical pin affixed to said "L"-shaped portion at a point thereon aligned with said means for attachment to the crop implement;
- a hyraulic cylinder means pivotally connected at one end to said extending support means at a point thereon near its free end and pivotally connected at its other end to the horizontal tie rod near its connection to said lever; and
- means for detecting lateral movement of the crop implement with respect to the crop rows and transmitting proportionate signals to a means for controlling said hydraulic cylinder, whereby the crop implement will be guided along a crop row independent of the relative lateral position of the tractor.

18. The guidance device of claim 17, further comprising:
- a second "L"-shaped portion of the inverted "U"-shaped support means, having means for rigid attachment to the crop implement said second "L"-shaped portion having one horizontal leg and a second leg depending from said one leg;
- a second extending support means aligned with the direction of travel and rigidly attached to said second "L"-shaped portion at the juncture of its two legs, said second support means extending outwardly from said second "L"-shaped portion to a free end thereof;

a second lever connected intermediate its ends, for pivotal rotation about a horizontal axis oriented transverse to the direction of travel, to a point on the depending leg of said second "L"-shaped portion near the lower end thereof, said second lever having means for pivotal connection at its lower end to the trailing end of a second arm of the tractor hitch and being pivotally connected at its upper end to a second end of said horizontal tie rod, said "L"-shaped portions adjoining to form the inverted "U"-shaped support means said pin affixed to said inverted "U"-shaped support means where said "L"-shaped portions adjoin, said first and second levers being attached to said tie rod equidistant from the pin;

a second cylinder means pivotally connected at one end to said second extending support means at a point thereon near its free end and pivotally connected at its other end to the horizontal tie rod near its connection to said second lever; and wherein said control means includes means for simultaneously controlling second second hydraulic cylinder complementary to said first hydraulic cylinder, whereby the guidance device will operate with better balance and less stress on individual parts.

19. The guidance device of claim 18, further comprising:

a pair of articulated arms having vertical axes of articulation and means for vertical, pivotal, mirror-image attachment to the tractor, said arms vertically pivotally connected each to an opposite side of a base frame;

two base frame carrier members universally pivoted to each free end of the inverted "U"-shaped support means and pivotally connected at their other ends each to one side of said base frame;

a rotatable wheel on an axle, said axle pivotally mounted between the ends of a pair of parallel arms, for pivotal movement in the same plane as said parallel arms, said parallel arms being universally connected at their other ends to said base frame;

a hydraulic steering valve, attached to said base frame between said parallel arms, having a rotatable actuator rod;

a steering valve activating arm pivotally attached to said actuator rod and projecting between said parallel arms; and a collar slidably mounted on and supporting said activating arm parallel to said parallel arms by means of an extension strap fixedly connecting said collar to one of said activating arms.

* * * * *